(12) United States Patent
Yu et al.

(10) Patent No.: US 7,781,983 B1
(45) Date of Patent: Aug. 24, 2010

(54) CLOSED-LOOP FEEDBACK CIRCUIT FOR CONTROLLING LEDS

(75) Inventors: Jane Xiaoying Yu, Saratoga, CA (US); Wei Bing Jing, BeiJing (CN)

(73) Assignees: Vimicro Corporation, Beijing (CN); Wuxi Vimicro Corporation, Wuxi, Jinagsu (CN)

( * ) Notice: Subject to any disclaimer, the term of this patent is extended or adjusted under 35 U.S.C. 154(b) by 165 days.

(21) Appl. No.: 11/780,473

(22) Filed: Jul. 20, 2007

(51) Int. Cl.
*H05B 37/02* (2006.01)

(52) U.S. Cl. .................... 315/291; 315/209 R; 327/108

(58) Field of Classification Search .............. 327/108, 327/109, 157, 423, 482, 513, 514, 515, 530, 327/538, 543, 588; 315/86, 129, 136, 149, 315/150, 158, 159, 185 R, 169.1, 169.3, 179, 315/193, 200 A, 209 R, 224, 276, 291, 307, 315/312, DIG. 4; 361/42, 56, 58, 87, 88, 361/92, 93.4, 111, 115, 127; 340/509, 527, 340/545.1, 555, 568.2, 573.1, 635, 636.15, 340/638, 644, 654, 657, 661, 663, 664, 691.4, 340/815.4, 815.45, 815.67; 362/183, 227, 362/231, 234, 240, 394, 464, 545, 800, 812

See application file for complete search history.

(56) References Cited

U.S. PATENT DOCUMENTS

| | | | |
|---|---|---|---|
| 6,556,083 B2 * | 4/2003 | Kadanka | 330/292 |
| 2005/0030090 A1 * | 2/2005 | Deng | 327/539 |
| 2006/0033536 A1 * | 2/2006 | Thelen et al. | 327/108 |

\* cited by examiner

*Primary Examiner*—Douglas W Owens
*Assistant Examiner*—Jae K Kim
(74) *Attorney, Agent, or Firm*—Wuxi Sino IP Agency, Ltd.; Joe Zheng

(57) ABSTRACT

A circuit for controlling LEDs is described. The circuit includes a negative feedback closed-loop circuit provided to sense only the voltage on an LED. Any change in the voltage is caused to be corrected by the negative feedback closed-loop circuit in conjunction with a current source.

10 Claims, 4 Drawing Sheets

(b)

(a)

CLOSED-LOOP FEEDBACK CIRCUIT FOR CONTROLLING LEDS

BACKGROUND OF THE INVENTION

1. Field of the Invention

The present invention relates to the area of integrated circuits, and more particularly to a closed-loop feedback circuit for controlling a current flowing through one or more light-emitting diodes.

2. Description of Related Art

A light-emitting diode (LED) is a semiconductor device that emits incoherent narrow-spectrum light when electrically biased in the forward direction of the p-n junction. This effect is a form of electroluminescence. An LED is a small area source with extra optics added to the chip that makes it emit a certain radiation pattern. The color of the emitted light depends on the composition and condition of the semiconducting material used, and can be infrared, visible or near-ultraviolet.

LEDs are commonly used as a lighting source in applications. It is commonly known that a current going through an LED controls the brightness of the emitting light from the LED. However, unlike incandescent light bulbs, which light up regardless of the electrical polarity, LEDs will only light with positive electrical polarity. When the voltage across the p-n junction is in the correct direction, a significant current flows and the device is said to be forward-biased, thus emitting light. If the voltage is of the wrong polarity, the device is said to be reverse biased, very little current flows, thus no light is emitted.

Because the voltage versus current characteristics of an LED are much like any diode (that is, current approximately an exponential function of voltage), a small voltage change results in a huge change in current, resulting in brightness variations of the LED. Changes in brightness, if not so designed, are not desirable. Accordingly, there is a need for control circuit that is able to regulate a voltage applied across an LED to keep a constant current flowing an LED.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to a circuit for controlling LEDs. According to one aspect of the present invention, a negative feedback closed-loop circuit is provided to sense only the voltage on an LED. Any change in the voltage is caused to be corrected by the negative feedback closed-loop circuit in conjunction with a current source. The circuit may be advantageously used in portable device to control LEDS as a backlighting source.

The present invention may be implemented as a circuit or a part of integrated circuit. According to one embodiment, the present invention is a circuit for controlling an LED, the circuit comprises a current source providing a source current; and a negative feedback closed-loop circuit controlled by a replica current of the source current, the negative feedback closed-loop circuit including an op-amp with a (−) input and a (+) input, the (−) input coupled to sense a voltage across the LED, wherein any change in the voltage causes a change in an output of the op-amp that in return causes a corresponding change in the (+) input such that the voltage is maintained unchanged, as a result, a current going through the LED remains unchanged, leading to a stable brightness of the LED.

One of the features, benefits and advantages in the present invention is to provide techniques for providing a constant current to an LED.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Use of color displays in cell phones and other handheld electronics is behind a move to white LEDs for display and keypad lighting. Color displays must be lit with white light for the colors to appear true. White LEDs are more rugged, more efficient, simpler to drive, smaller, thinner and far less noisy than their cold-cathode florescent tube cousins. Many portable systems employ a single lithium-ion or multiple NiMH batteries to drive the white LEDs used for backlighting small-format displays. A driver must be provided to control a proper forward voltage for the white LEDs, which are typically in the range of 3.3V to 4.0V. In addition, these drivers must provide well-matched current sources to ensure the currents through all the LEDs are virtually identical. This keeps brightness of all LEDs perfectly matched so they can provide a consistent light output over the entire backlit display.

Figure 1:
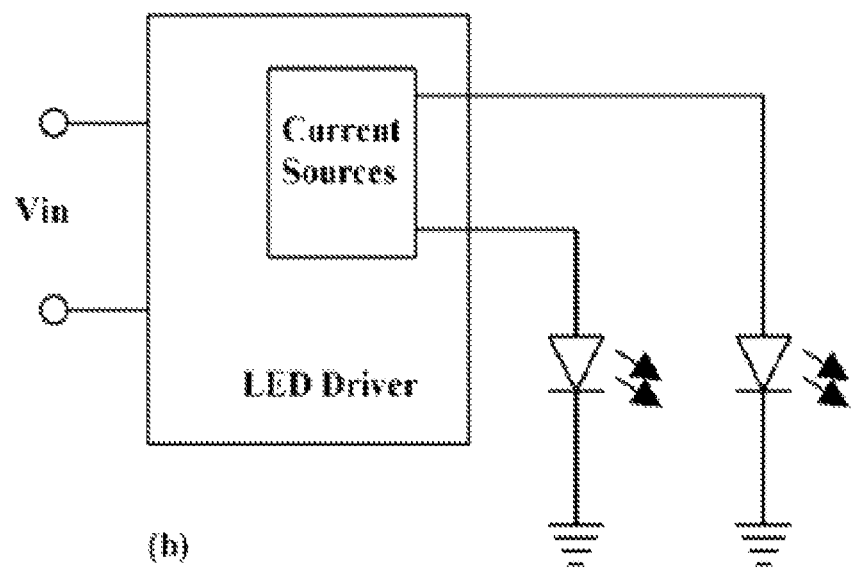
FIG. 1A and FIG. 1B show, respectively, LED drivers supplying currents to either parallel or series-connected LEDs.
Figure 1:
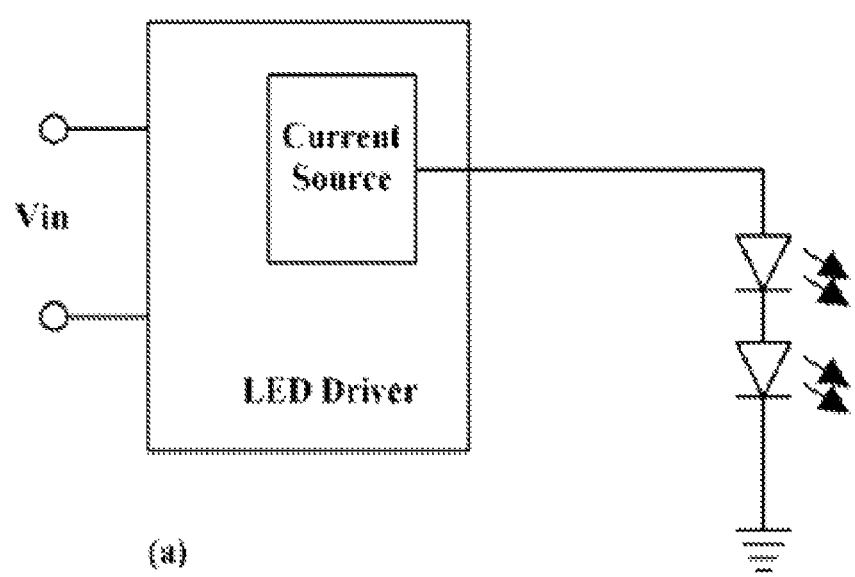

In a simplest drive configuration, one can power an LED with a voltage source and current-limiting resistor. However, in practical applications, a driver IC is often used to drive LEDs with a constant-current source that regulates the current regardless of power supply voltage variations or variations in forward voltage applied thereon. This produces matched brightness when using multiple LEDs. LED drivers supply currents to either parallel or series-connected LEDs as shown in FIG. 1A and FIG. 1B. When driving series-connected LEDs, the LED driver IC must supply enough voltage to accommodate the number of LEDs in a string. Thus, the driver ICs for series-connected LEDs usually step-up their applied voltage. Parallel LED drivers provide only the voltage required by a single LED, but each output must be capable of providing the appropriate current for each of the LEDs.

Figure 2:
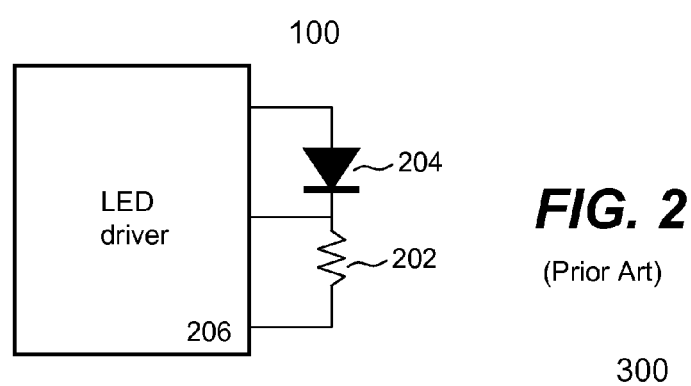
FIG. 2 shows an exemplary diagram using an external resistor.

To monitor the brightness of an LED, an LED driver is designed to have a detection capability of the current being provided. FIG. 2 shows an exemplary diagram 200 using an external resistor 202. To detect a current going through the LED 204, a driver 206 is designed to sample a voltage across the resistor 202. Using the formula of current I=V/R, where V is the voltage across the resistor 202, and R is the resistance of the resistor 202. The current going through the LED 204 can be estimated. However, the resistor 202 itself may introduce a level of instability in addition to extra power consumption from the driver 206 or other devices. For a portable device, the low power consumption is very important in achieving long operating hours for the device.

Figure 3:
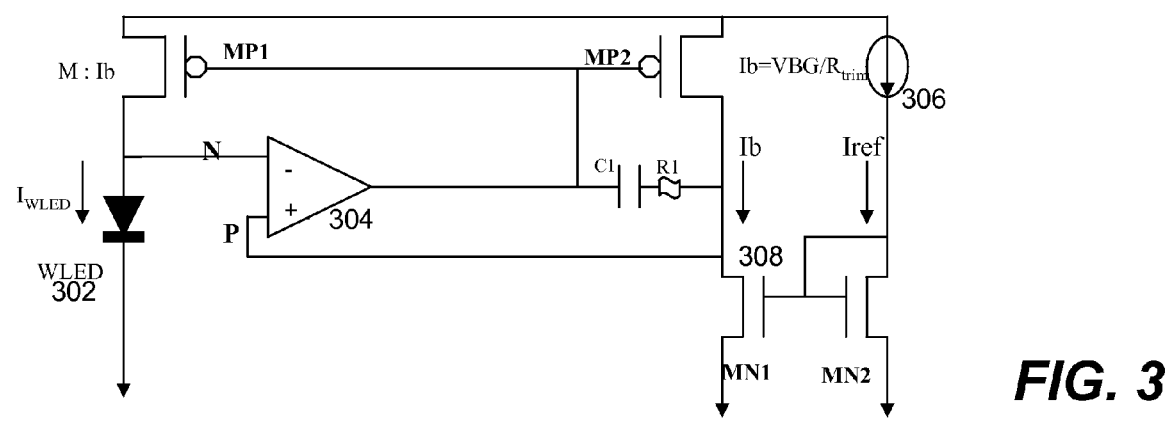
FIG. 3 shows an exemplary circuit according to one embodiment of the present invention.

FIG. 3 shows an exemplary circuit 300 according to one embodiment of the present invention. Instead of using an external resistor, the circuit 300 is designed to sample a voltage right across an LED 302 using an Operational Amplifier (Op-Amp) 304. The op-amp 304 is basically a differential amplifier having a large voltage gain, very high input impedance and low output impedance. The op-amp has an "inverting" or (−) input and "non-inverting" or (+) input and a single output. In one embodiment, the voltage Vn right across the LED 302 is coupled to the (−) input of the op-amp 304. The (+) input of the op-amp 304 is coupled to the drain (D) of the transistor MN1.

Operationally, there is a negative feedback closed-loop circuit formed by the op-amp 304, a capacitor C1, a resistor R1, a pair of transistors MP1 and MP2. When there is a change in Iwled, a current going through the LED 302, there will be a corresponding change in voltage Vn. The feedback closed-loop circuit will keep current Iwled unchanged by closely following the change of the Vn. For example, if Iwled is increased for whatever reason it may be, which causes a corresponding increase in voltage Vn. The increase is received at the (−) input of the op-amp 304 that reflects a decrease in the output. The decreased output applied to the transistor MP2 causes a decrease in current Ib. The decreased current Ib, however, introduces a decrease on the voltage at the drain (D) of the transistor MN1. The decreased voltage in return is sampled by the (+) input of the op-amp 304. With a proper adjustment, the decreased voltage at the (+) input of the op-amp 304 pulls down the increased voltage at the (−) input of the op-amp 304, keeping the difference between the (−) input and the (+) input of the op-amp 304 close to zero. With the decreased Vn, current Iwled has to do down, which is achieved by the mirror circuit comprising MP1 and MP2.

As shown in FIG. 3, the negative feedback closed-loop circuit operates with a current source 306 supplying a current Iref. Since current Ib is a replica of current Iref, current Iwled is M times of Iref which is extracted from a calculation VBG/Rtrim, where VBG is a bandgap reference voltage, and Rtrim is a trim resistor (not shown). The replica current Ib is largely independent of temperature and process variations. Since current Ib remains unchanged, current Iwled is kept unchanged through the negative feedback closed-loop circuit.

According to one embodiment, the transistors MN1 and MN2 are NMOS type while the transistors MP1 and MP2 are PMOS type. For the first order accuracy, the transistors MN1 and MN2 match each other and provide a programmed current bias. The second order accuracy is corrected by the negative feedback closed-loop circuit as described above.

Figure 4:
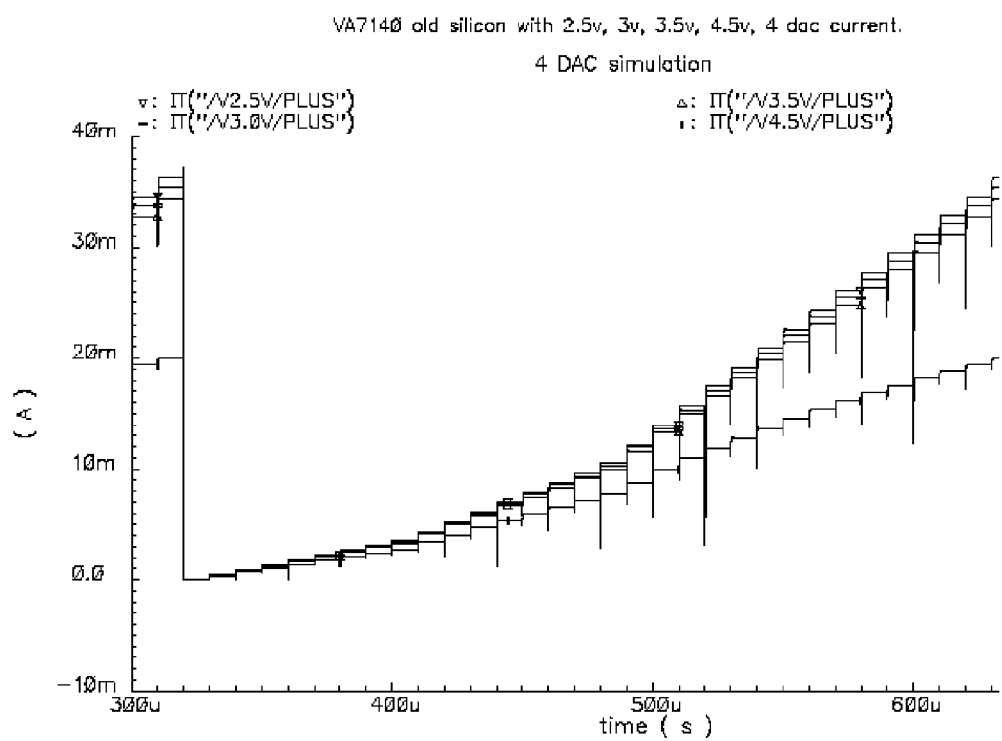
FIG. 4 shows a simulation result of using a set of prior art LED drivers.
Figure 5:
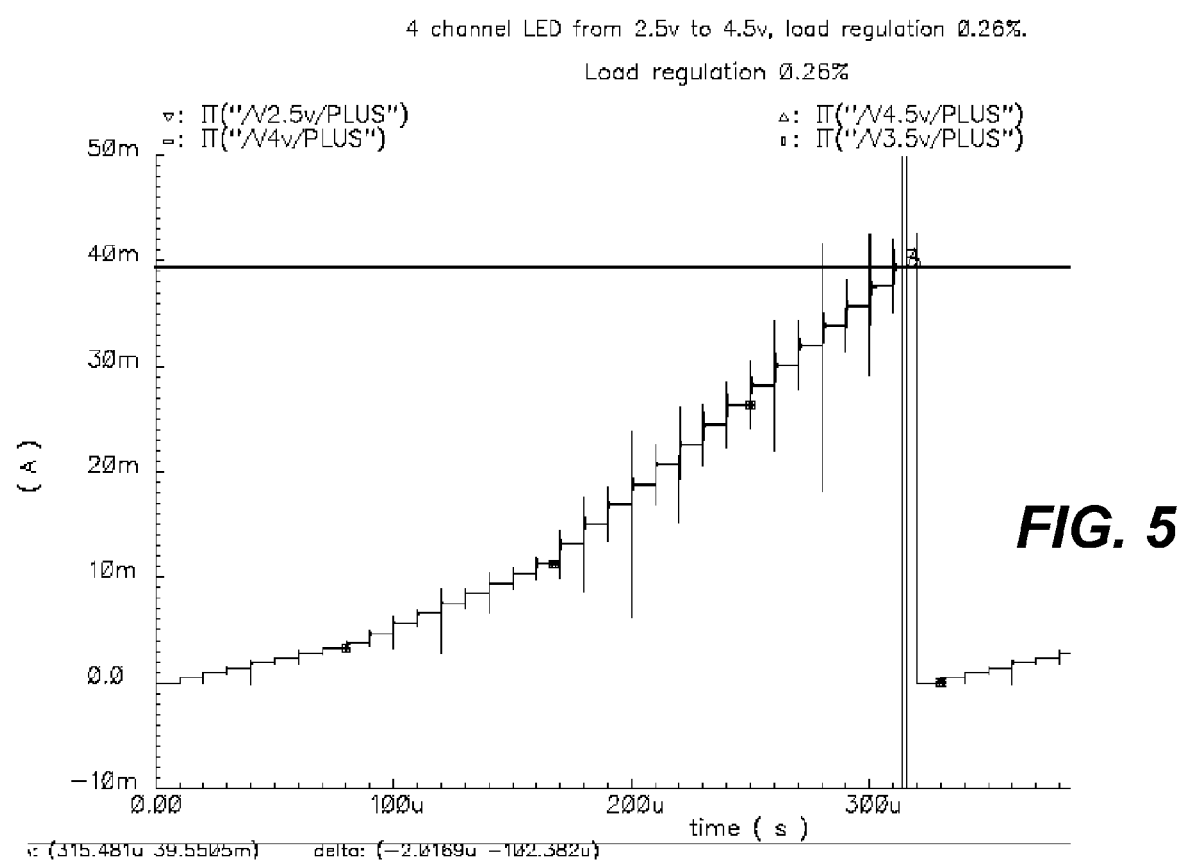
FIG. 5 shows a simulation result of using one embodiment of the present invention.

FIG. 4 shows a simulation result of using a set of prior art LED drivers. By applying four staggering voltages (e.g., 2.5V, 3.0V, 3.5V and 4.0V) across four LEDs, respectively, the simulation result shows, as time goes by, the respective currents in the four LEDs become disparate. FIG. 5 shows a simulation result of using one embodiment of the present invention, by the same staggering voltages across four LEDs, the simulation result shows, as time goes by, the respective currents in the four LEDs remain substantially unchanged. In other words, these four LEDs shall provide equal brightness.

It should be noted that the above description seems to control white LEDs. Those skilled in the art shall appreciate that the present invention is equally applicable to other types of LEDs that are required to provide constant brightness.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A circuit for driving an LED, the circuit comprising:
a current source providing a source current;
a negative feedback closed-loop circuit, controlled by a replica current of the source current, including an op-amp, a capacitor, a resistor, and a pair of transistors, wherein a (−) input of the op-amp is coupled to a voltage across the LED, any change in the voltage causes a change in an output of the op-amp that in return causes a corresponding change in a (+) input of the op-amp such that the voltage is maintained unchanged, the output of the op-amp is directly coupled to the capacitor that is charged and discharged via the resistor connected thereto to stabilize a supply voltage being applied on the pair of transistors, thus a current going through the LED remains unchanged, leading to a stable brightness of the LED, and wherein the resistor is connected to a common node of the pair of transistors.

2. The circuit as recited in claim 1, further including a mirror circuit to get the replica current through a pair of additional two transistors.

3. The circuit as recited in claim 2, wherein the pair of two transistors are PMOS and the pair of additional two transistors are NMOS.

4. The circuit as recited in claim 3, wherein, whenever there is an increase in the voltage across the LED, the output of the op-amp decreases and causes a corresponding decrease in the voltage applied to the transistor that pulls down the voltage across the LED to keep the current going through the LED unchanged.

5. The circuit as recited in claim 3, wherein, whenever there is a decrease in the voltage across the LED, the output of the op-amp increases and causes a corresponding increase in the voltage applied to the transistor that pulls up the voltage across the LED to keep the current going through the LED unchanged.

6. The circuit as recited in claim 1, wherein the replica current is largely independent of temperature and process variations.

7. The circuit as recited in claim 6, wherein the current going through the LED is M times of the replica current.

8. The circuit as recited in claim 7, wherein the replica current is amplified by a pair of transistors by M times to create the current going through the LED.

9. The circuit as recited in claim 1, wherein the LED is a white LED used in a portable device to be a backlighting source.

10. The circuit as recited in claim 9, wherein brightness of the white LED is kept stable.

* * * * *